(12) United States Patent
Lane et al.

(10) Patent No.: US 11,049,674 B2
(45) Date of Patent: Jun. 29, 2021

(54) PUSH BUTTON WITH HAPTIC FEEDBACK

(71) Applicant: Microsoft Technology Licensing, LLC, Redmond, WA (US)

(72) Inventors: David Michael Lane, Sammamish, WA (US); Thomas Joseph Longo, Redmond, WA (US)

(73) Assignee: Microsoft Technology Licensing, Redmond, WA (US)

( * ) Notice: Subject to any disclaimer, the term of this patent is extended or adjusted under 35 U.S.C. 154(b) by 0 days.

(21) Appl. No.: 15/648,057

(22) Filed: Jul. 12, 2017

(65) Prior Publication Data
US 2019/0019639 A1    Jan. 17, 2019

(51) Int. Cl.
| H01H 13/85 | (2006.01) |
| G06F 3/02 | (2006.01) |
| H01H 3/12 | (2006.01) |
| G06F 3/01 | (2006.01) |
| H01H 13/705 | (2006.01) |

(52) U.S. Cl.
CPC .............. *H01H 13/85* (2013.01); *G06F 3/016* (2013.01); *G06F 3/0202* (2013.01); *H01H 3/12* (2013.01); *H01H 13/705* (2013.01); *H01H 2215/004* (2013.01); *H01H 2215/052* (2013.01)

(58) Field of Classification Search
CPC .. H01H 13/85; H01H 2215/052; H01H 13/14; H01H 2003/008; H01H 2215/00; H01H 2215/03; H01H 57/00; H01H 13/705; H01H 2057/006; H01H 2215/004; H01H 3/125; H01H 2201/02; H01H 2217/004; H01H 2217/006; H01H 13/22; H01H 13/48
See application file for complete search history.

(56) References Cited

U.S. PATENT DOCUMENTS

| 8,248,277 | B2 | 8/2012 | Peterson et al. |
| 9,012,795 | B2 | 4/2015 | Niu |
| 9,087,659 | B2 | 7/2015 | Li et al. |
| 9,178,509 | B2 | 11/2015 | Bernstein |
| 2010/0089735 | A1 | 4/2010 | Takeda et al. |
| 2012/0020045 | A1* | 1/2012 | Tanase ............. H01H 13/85 361/807 |

(Continued)

OTHER PUBLICATIONS

Kim, et al., "A Study of Touch Typing Performance with Keyclick Feedback", In Proceedings of IEEE Haptics Symposium, Feb. 23, 2014, pp. 227-233.

(Continued)

*Primary Examiner* — Ahmed M Saeed
(74) *Attorney, Agent, or Firm* — Holzer Patel Drennan

(57) ABSTRACT

Mechanical key design for keyboards often includes rubber or metal dome switches along with scissor mechanisms that offer a desirable feel and overall performance or achieve the key travel necessary to meet shrinking overall keyboard thickness specifications, but not both. Haptic feedback devices offer a user sensory feedback signifying a selection has been made without any physical travel of a keypad, but also may not offer the user a desirable feel and overall performance. The following describes in detail keys or push buttons that offer the user a desirable feel and performance, while meeting shrinking overall keyboard thickness specifications.

21 Claims, 8 Drawing Sheets

(56) References Cited

U.S. PATENT DOCUMENTS

| | | | |
|---|---|---|---|
| 2012/0092263 A1* | 4/2012 | Peterson | G06F 3/016 345/168 |
| 2012/0249315 A1* | 10/2012 | Vanhelle | B60K 37/06 340/425.5 |
| 2014/0027254 A1* | 1/2014 | Kudrna | H01H 13/85 200/5 A |
| 2014/0116865 A1 | 5/2014 | Leong et al. | |
| 2014/0340208 A1 | 11/2014 | Tan et al. | |
| 2015/0122621 A1* | 5/2015 | Fukumoto | H03K 17/9622 200/5 A |
| 2016/0098107 A1 | 4/2016 | Morrell et al. | |

OTHER PUBLICATIONS

"Razer Mechanical Switches", https://www.razerzone.com/au-en/razer-mechanical-switches, Published on: Feb. 23, 2014, 4 pages.
"International Search Report and Written Opinion Issued in PCT Application No. PCT/US2018/034794", dated Aug. 3, 2018, 13 Pages.

* cited by examiner

PUSH BUTTON WITH HAPTIC FEEDBACK

BACKGROUND

A computer keyboard or blade is a typewriter-style device having an arrangement of keys representing symbols or functions. The individual keys act as mechanical levers and electronic switches that convert physical operation of the keys into signals that may be interpreted by a computing device to signify a user's selection of a symbol or function. As computing devices shrink in overall thickness, keyboards associated with the computing devices are also expected to shrink in thickness. However, user expectations demand that keypad feel and performance remain substantially the same or improved.

Traditional mechanical key design includes rubber dome switches that offer a desirable feel and overall performance, but often require a key travel that is not attainable within a shrinking keyboard thickness specification. In some implementations, metal dome switches achieve the key travel necessary to meet the shrinking overall keyboard thickness specification, but often do not offer the user a desirable feel and overall performance. In other implementations, haptic feedback devices offer a user sensory feedback signifying a selection has been made without any physical travel of a keypad, but may also not offer the user a desirable feel and overall performance.

SUMMARY

Implementations described and claimed herein provide a push button comprising a spring element with a user-perceptible physical travel upon depression of the push button, and a haptic element that simulates additional travel of the push button upon depression of the push button.

Implementations described and claimed herein further provide a method for providing haptic feedback comprising detecting a user-perceptible physical travel of a push button, actuating a haptic element in response to reaching a point along the physical travel of the push button, and transmitting a haptic response from the haptic element via the push button to a user to simulate additional travel of the push button.

Implementations described and claimed herein still further provide a keyboard comprising an array of keys, an array of spring elements, and an array of haptic elements. Each spring element is oriented below one of the keys with a user-perceptible physical travel upon depression of the key and each haptic element is also oriented below one of the keys simulating additional travel upon depression of the key.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

The following describes in detail keys or push buttons that offer the user a desirable feel and performance, while meeting a keyboard thickness specification that is thinner than traditional keyboards.

Figure 1:
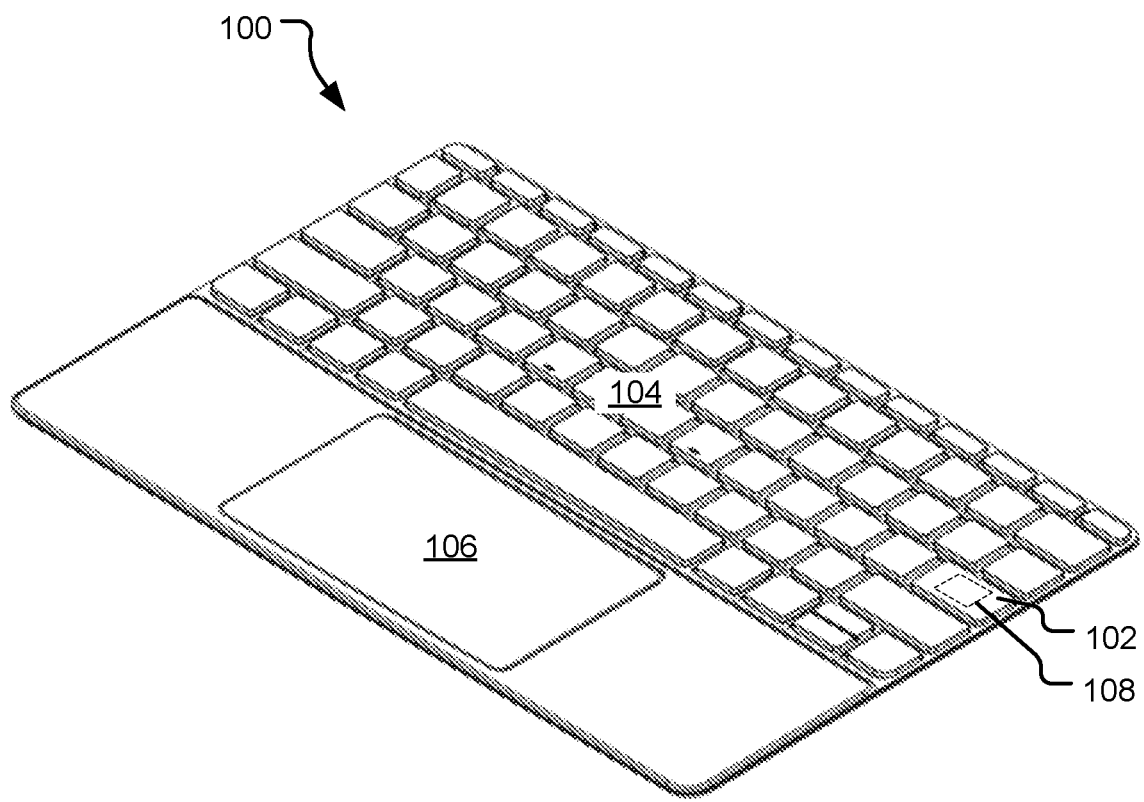
FIG. 1 illustrates a perspective view of an example keyboard with individual key switches that both physically depress and offer haptic feedback to a user.

FIG. 1 illustrates a perspective view of an example keyboard 100 with individual keys (e.g., key 102) that both physically depress and offer haptic feedback to a user (not shown). More specifically, the keyboard 100 includes a keypad 104, which contains an array of keys (e.g., the key 102) arranged in a predetermined pattern (e.g., QWERTY). Each key within the keypad 104 may be communicatively connected to a flexible flat cable (not shown) that provides connectivity to the keyboard 100 and ultimately an associated computing device (also not shown). In various implementations, the keys within the keypad 104 may also be connected via integrated membranes printed with electrical traces or the keypad 104 may implement optics or magnetics to detect actuation of individual keys.

The keyboard 100 also includes a user-depressible touchpad 106 (alternatively a trackpad or a mousepad) that converts physical user inputs into corresponding electrical signals that may be interpreted by the computing device. The keyboard 100 may also secure additional electronic components or other user user-depressible interface components (e.g., push buttons, dials, and knobs, not shown). In various implementations, some or all of the individual keys, the touchpad 106, and the push buttons, dials, and knobs incorporated within the keyboard 100 may both physically depress and offer haptic feedback to the user.

The individual keys (or other user-depressible interface components) may have a variety of mechanical arrangements that achieve a specified physical depression magnitude (or key travel), with a variety of force-deflection profiles (see e.g., keys 202, 302, 402, 502 of FIGS. 2-5, respectively). In various implementations, such mechanical structures may include one or more of scissor mechanisms, springs, rubber domes, metal domes, and resiliently compressible pads to achieve the specified key travel. In various implementations, a keyboard thickness specification may be less than 5.0 mm, 3.0-4.0 mm of which is available for the keyset. As a result, the individual keys of the keyboard 100 have between 0.2 mm and 1.0 mm of physical key travel to offer the user a perceptible physical travel for a desirable feel and overall keyboard performance.

To enhance the user-perceptible physical key travel, each of the keys have a haptic feedback device (e.g., haptic element 108) that works in conjunction with the physical travel of the individual keys to simulate additional key travel to the user. The actual physical travel combined with the simulated additional travel of the keys may offer the user a more desirable feel and overall performance than either the physical travel or simulated travel would otherwise alone.

The haptic element 108 enhances the user-perceptible physical key travel by generating vibration or other repeated forces or motions (collectively, haptic responses) and transmitting the generated vibration, forces, or motions to the user via the key 102 concurrently or immediately before or after the physical travel of the key 102. The haptic element 108 may utilize a variety of technologies to generate the vibration or other repeating forces or motions (e.g., weighted and unbalanced (linear or rotational) motors or electromagnetic actuators, piezoelectric devices, vibra-motors, electrostatic feedback devices, and ultrasonic feedback devices). In various implementations, the haptic element 108 may generate feedback that simulates approximately the same or double the actual physical key travel.

In various implementations, the keyboard 100 may be physically and/or communicatively coupled to a tablet computer, a laptop computer, a personal computer, a gaming device, a smart phone, or any other discrete device that carries out one or more specific sets of arithmetic and/or logical operations. Further, features of the individual keys of the keyboard 100 described herein may be applied to any push button or other user-depressible interface component, with or without the keyboard 100. For example, the user-depressible interface component may be applied to vehicles (e.g., automobiles, watercraft, and aircraft), consumer electronics (e.g., cameras, telephones, and home appliances), and industrial or commercial machinery.

In other implementations, the keyboard 100 may be covered by a fabric covering (not shown) that serves to seal the interior of the keyboard 100 from contaminates and hides seams between the various components of the keyboard 100. In some implementations, two sheets of fabric are oriented on each side of the keyboard 100 and are laminated together to form the fabric covering. The fabric covering may include one or more windows that expose the keypad 104 and the touchpad 106 to the user or the fabric covering may conceal the keypad 104 and the touchpad 106. In implementations where the fabric covering conceals the keypad 104 and the touchpad 106, the fabric covering permits physical depression of the individual keys and transmits haptic feedback from the individual keys to the user. The fabric covering may further offer a desirable tactile experience for the user and may be less than 0.5 mm thick.

Figure 2:
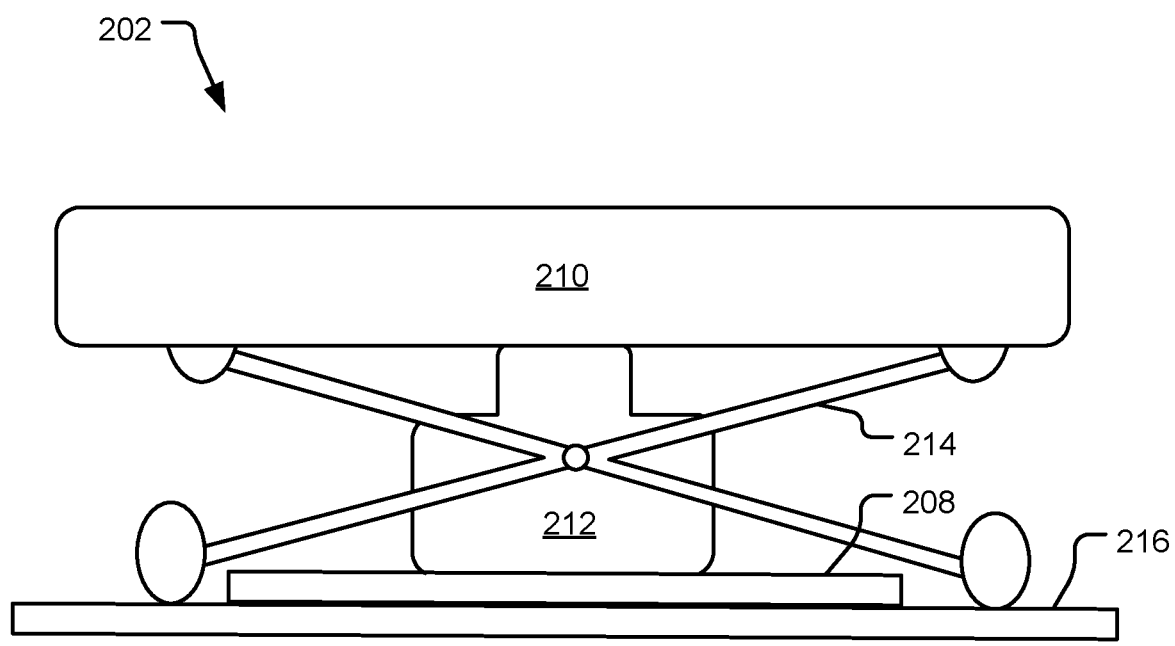
FIG. 2 illustrates a sectional elevation view of a first example key that both physically depresses and offers haptic feedback to a user.

FIG. 2 illustrates a sectional elevation view of a first example key 202 that both physically depresses and offers haptic feedback to a user (not shown). The key 202 includes a keycap 210 suspended over a rubber dome 212 and a haptic element 208 via a scissor mechanism 214. More specifically, the scissor mechanism 214 spans a distance between the keycap 210 and an attachment surface 216 of an associated keypad (not shown, see e.g., keypad 104 of FIG. 1). The scissor mechanism 214 is collapsed by elongating its crossing structure when a user applies compressive force on the keycap 210. The scissor mechanism 214 returns to its original position when the compressive force is removed. In effect, the scissor mechanism 214 serves to maintain vertical alignment and permit smooth movement when the key 202 is depressed and returned to its original position. The quantity that the scissor mechanism 214 collapses defines the physical travel of the key 202.

The rubber dome 212 (or polydome) is a formed silicone, polyurethane, or other resilient plastic or rubber plunger. As the scissor mechanism 214 is compressed, the rubber dome 212 is also compressed and a portion of it protrudes out of the bottom. The protruding portion contacts a 3-layer membrane with silver (or other conductive) traces that are electrically connected when compressed together. In other implementations, the rubber dome 212 has a central bottom surface coated in graphite or conductive rubber, or it includes a carbon puck. As the scissor mechanism 214 is compressed, the rubber dome 212 is also compressed and the conductive surface or puck protrudes out of the bottom of the rubber dome 212 and electrically connects two underlying circuit board traces (not shown). An electrical connection between the circuit board traces by the rubber dome 212 signals that the key 202 has been depressed to an associated computing device (not shown). One or both of the rubber dome 212 and the scissor mechanism 214 may also act as one or both of a spring and a dampener, serving to return the key 202 to its original un-compressed position absent a compressive force on the keycap 210.

To enhance the user-perceptible physical key travel, the key 202 further includes a haptic element 208 under the rubber dome 212 that works in conjunction with the physical travel of the key 202 to simulate additional key travel to the user. The actual physical travel combined with the simulated additional travel of the key 202 may offer the user a more desirable feel and overall performance than either the physical travel or simulated travel would otherwise alone.

The haptic element 208 enhances the user-perceptible physical key travel by generating vibration or other repeating forces or motions (collectively, haptic responses) and transmitting the generated vibration, forces, or motions to the user via the key 202 concurrently or immediately before or after the physical travel of the key 202. The haptic element 208 may utilize a variety of technologies to generate the vibration, forces, or motions, as described in detail with reference to FIG. 1. In various implementations, the haptic element 208 may be triggered at the beginning of the physical travel of the key 202, at the end of the physical travel of the key 202, or at any point therebetween.

In various implementations, the key 202 may be 2.0 mm to 4.0 mm thick, with 0.3 mm to 1.6 mm of physical key travel to offer the user a perceptible physical travel for a desirable feel and overall performance. In various implementations, the haptic element 208 may generate feedback that simulates a distance equal to the actual key travel for a total perceived key travel of 0.6 mm to 3.2 mm.

Figure 3:
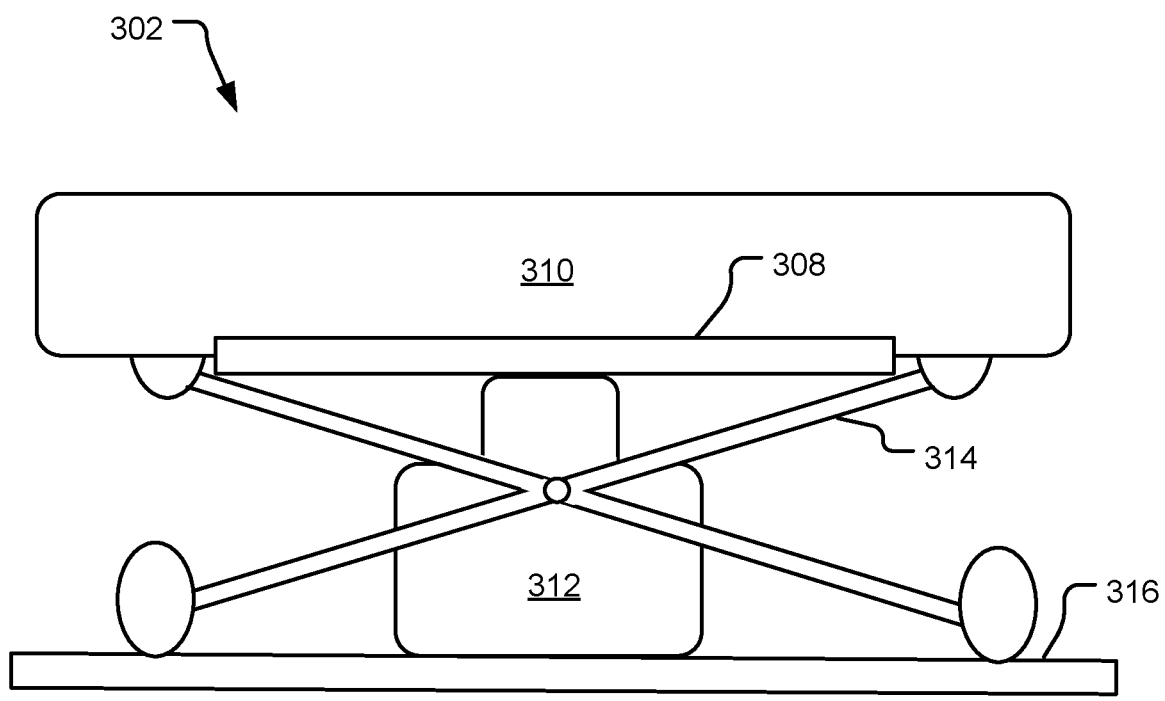
FIG. 3 illustrates a sectional elevation view of a second example key that both physically depresses and offers haptic feedback to a user.

FIG. 3 illustrates a sectional elevation view of a second example key 302 that both physically depresses and offers haptic feedback to a user (not shown). The key 302 includes a keycap 310 suspended over a rubber dome 312 and a haptic element 308 via a scissor mechanism 314. More specifically, the scissor mechanism 314 spans a distance between the keycap 310 and an attachment surface 316 of an associated keypad (not shown, see e.g., keypad 104 of FIG. 1). As described in detail with reference to FIG. 2 above, the scissor mechanism 314 is collapsed when a user applies compressive force on the keycap 310 and the scissor mechanism 314 returns to its original position when the compressive force is removed. The quantity that the scissor mechanism 314 collapses defines the physical travel of the key 302.

The rubber dome 312 is a formed plunger with a central bottom surface coated in graphite. As also described in detail with reference to FIG. 2 above, as the scissor mechanism 314 is compressed, the rubber dome 312 is also compressed and signals that the key 302 has been depressed to an associated computing device (not shown). One or both of the rubber dome 312 and the scissor mechanism 314 may also act as one or both of a spring and a dampener, serving to return the key 302 to its original un-compressed position absent a compressive force on the keycap 310.

To enhance the user-perceptible physical key travel, the key 302 further includes a haptic element 308 above the rubber dome 312 that works in conjunction with the physical travel of the key 302 to simulate additional key travel to the user. The actual physical travel combined with the simulated additional travel of the key 302 may offer the user a more desirable feel and overall performance than either the physical travel or simulated travel would otherwise alone. In some implementations, the haptic element 308 is incorporated as a component of the keycap 310.

The haptic element 308 enhances the user-perceptible physical key travel by generating vibration or other repeating forces or motions (collectively, haptic responses) and transmitting the generated vibration, forces, or motions to the user via the key 302 concurrently or immediately before or after the physical travel of the key 302. The haptic element 308 may utilize a variety of technologies to generate the vibration, forces, or motions, as described in detail with reference to FIG. 1. In various implementations, the haptic element 308 may be triggered at the beginning of the physical travel of the key 302, at the end of the physical travel of the key 302, or at any point therebetween.

In various implementations, orienting the haptic element 308 below the scissor mechanism 314 (as illustrated in FIG. 2) places too much distance between the haptic element 308 and a user's finger (not shown) to adequately transmit the vibration, forces, or motions to the user's finger. Orienting the haptic element 308 directly below or incorporated within the keycap 310 permits the vibration, forces, or motions generated by the haptic element 308 to more directly and effectively transmit to the user's finger. In some implementations, a smaller haptic element 308 may be used when oriented as illustrated in FIG. 3 as compared to haptic element 208 oriented as illustrated in FIG. 2.

In various implementations, the key 302 may be 2.0 mm to 4.0 mm thick, with 0.3 mm to 1.6 mm of physical key travel to offer the user a perceptible physical travel for a desirable feel and overall performance. In various implementations, the haptic element 308 may generate feedback that simulates a distance equal to the actual key travel for a total perceived key travel of 0.6 mm to 3.2 mm.

Figure 4:
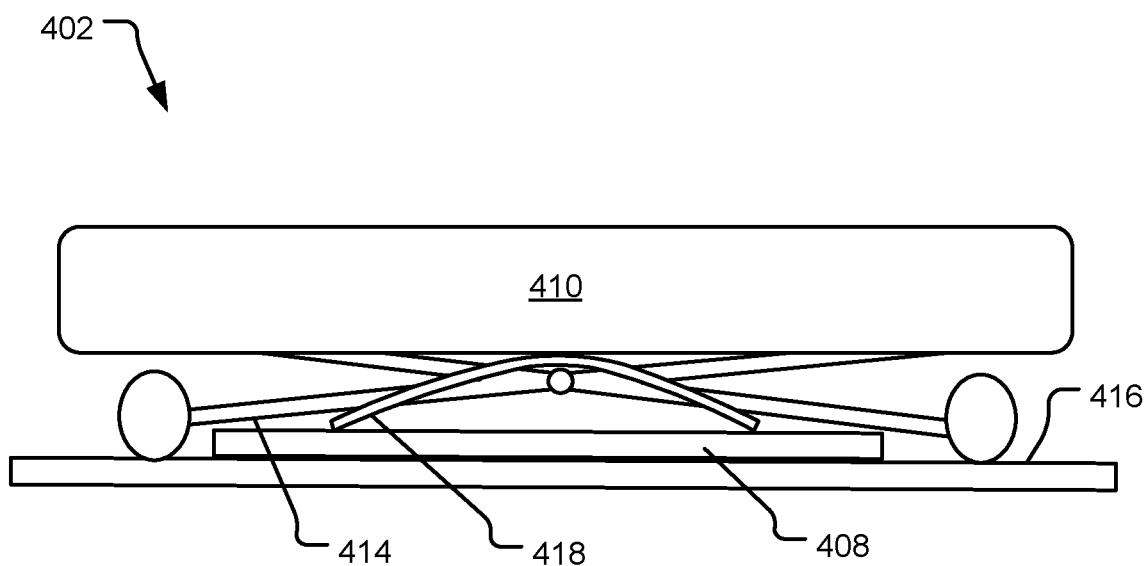
FIG. 4 illustrates a sectional elevation view of a third example key that both physically depresses and offers haptic feedback to a user.

FIG. 4 illustrates a sectional elevation view of a third example key 402 that both physically depresses and offers haptic feedback to a user. The key 402 includes a keycap 410 suspended over a metal dome 418 and a haptic element 408 via a scissor mechanism 414. More specifically, the scissor mechanism 414 spans a distance between the keycap 410 and an attachment surface 416 of an associated keypad (not shown, see e.g., keypad 104 of FIG. 1). As described in detail with reference to FIG. 2 above, the scissor mechanism 414 is collapsed when a user applies compressive force on the keycap 410 and the scissor mechanism 414 returns to its original position when the compressive force is removed. The quantity that the scissor mechanism 414 collapses defines the physical travel of the key 402.

The metal dome 418 is made of formed stainless steel (or other metal) that when compressed has a much shorter and sharper travel than a comparable rubber dome (see e.g., rubber dome 212 of FIG. 2). As the scissor mechanism 414 is compressed, the metal dome 418 is also compressed and contacts two underlying circuit board traces (not shown). A connection between the circuit board traces by the metal dome 418 signals that the key 402 has been depressed to an associated computing device (not shown). One or both of the metal dome 418 and the scissor mechanism 414 may also act as one or both of a spring and a dampener, serving to return the key 402 to its original un-compressed position absent a compressive force on the keycap 410.

To enhance the user-perceptible physical key travel, the key 402 further includes a haptic element 408 below the metal dome 418 that works in conjunction with the physical travel of the key 402 to simulate additional key travel to the user. The actual physical travel combined with the simulated additional travel of the key 402 may offer the user a more desirable feel and overall performance than either the physical travel or simulated travel would otherwise alone.

The haptic element 408 enhances the user-perceptible physical key travel by generating vibration or other repeating forces or motions (collectively, haptic responses) and transmitting the generated vibration, forces, or motions to the user via the key 402 concurrently or immediately before or after the physical travel of the key 402. The haptic element 408 may utilize a variety of technologies to generate the vibration, forces, or motions, as described in detail with reference to FIG. 1. In various implementations, the haptic element 408 may be triggered at the beginning of the physical travel of the key 402, at the end of the physical travel of the key 402, or at any point therebetween. In other implementations, the haptic element 408 may be oriented above the scissor mechanism 414 (as illustrated in FIG. 3), and perhaps incorporated into the keycap 410.

In various implementations, the key 402 may be 1.0 mm to 2.5 mm thick, with 0.1 mm to 0.6 mm of physical key travel to offer the user a perceptible physical travel for a desirable feel and overall performance. In various implementations, the haptic element 308 may generate feedback that simulates a distance equal to the actual key travel for a total perceived key travel of 0.2 mm to 1.2 mm.

Figure 5:
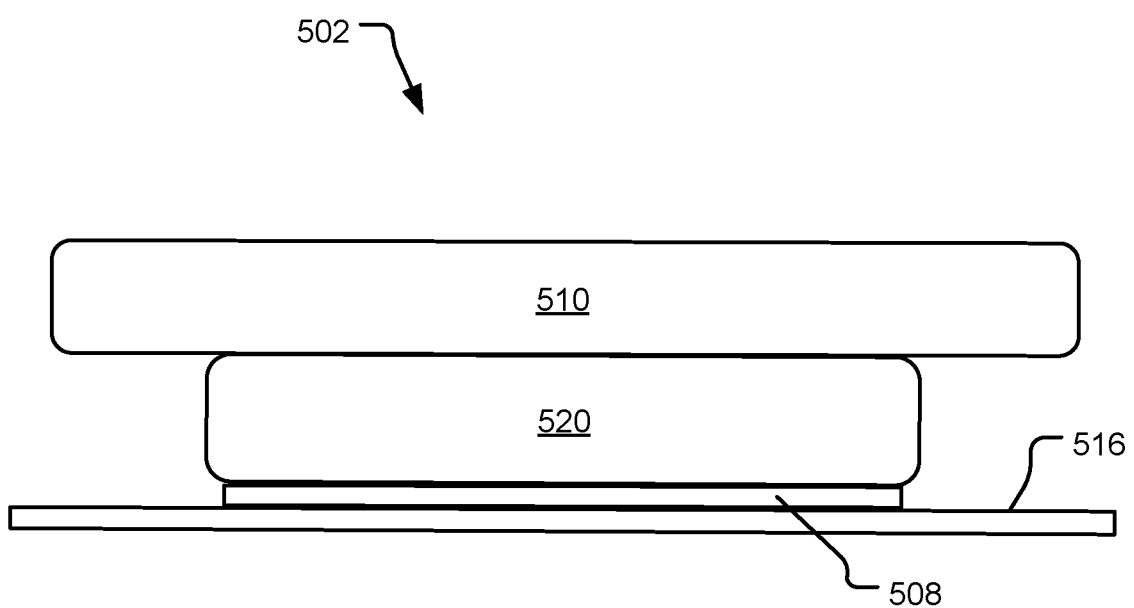
FIG. 5 illustrates a sectional elevation view of a fourth example key that both physically depresses and offers haptic feedback to a user.

FIG. 5 illustrates a sectional elevation view of a fourth example key 502 that both physically depresses and offers haptic feedback to a user. The key 502 includes a stacked arrangement of a keycap 510 attached to a resiliently compressible pad 520 which is attached to a haptic element 508, which is attached to an attachment surface 516 of an associated keypad (not shown, see e.g., keypad 104 of FIG. 1).

The resiliently compressible pad 520 operates as a spring, and perhaps a dampener. More specifically, the resiliently compressible pad 520 is compressed when a user applies compressive force on the keycap 510 and returns to its original position when the compressive force is removed. The quantity that the resiliently compressible pad 520 is intended to collapse under an expected compressive force defines the physical travel of the key 502. In other implementations, the resiliently compressible pad 520 is combined with the keycap 510 in a singular resiliently compressible structure.

The resiliently compressible pad 520 is made of any resiliently compressible material or composite structure (e.g., including one or more of silicone, gel, rubber, and foam). As the resiliently compressible pad 520 is compressed, it contacts two underlying circuit board traces (not shown). A connection between the circuit board traces by the resiliently compressible pad 520 signals that the key 502 has been depressed to an associated computing device (not shown).

To enhance the user-perceptible physical key travel, the key 502 further includes a haptic element 508 below the resiliently compressible pad 520 that works in conjunction with the physical travel of the key 502 to simulate additional key travel to the user. The actual physical travel combined with the simulated additional travel of the key 502 may offer the user a more desirable feel and overall performance than either the physical travel or simulated travel would otherwise alone. In various implementations, the haptic element 508 is incorporated into the keycap 510 or the resiliently compressible pad 520, and may be placed in a different location of the key 502 from that shown in FIG. 5.

The haptic element 508 enhances the user-perceptible physical key travel by generating vibration or other repeating forces or motions (collectively, haptic responses) and transmitting the generated vibration, forces, or motions to the user via the key 502 concurrently or immediately before or after the physical travel of the key 502. The haptic element 508 may utilize a variety of technologies to generate the vibration, forces, or motions, as described in detail with reference to FIG. 1. Further, the resiliently compressible pad 520 may distribute or dampen the vibration, forces, or motions generated by the haptic element 508 in an effort to improve the user experience. In various implementations, the haptic element 508 may be triggered at the beginning of the physical travel of the key 502, at the end of the physical travel of the key 502, or at any point therebetween.

In various implementations, the key 502 may be 0.6 mm to 2.5 mm thick, with 0.2 mm to 0.3 mm of physical key travel to offer the user a perceptible physical travel for a desirable feel and overall performance. In various implementations, the haptic element 508 may generate feedback that simulates a distance equal to the actual key travel for a total perceived key travel of 0.4 mm to 0.6 mm.

Figure 6:
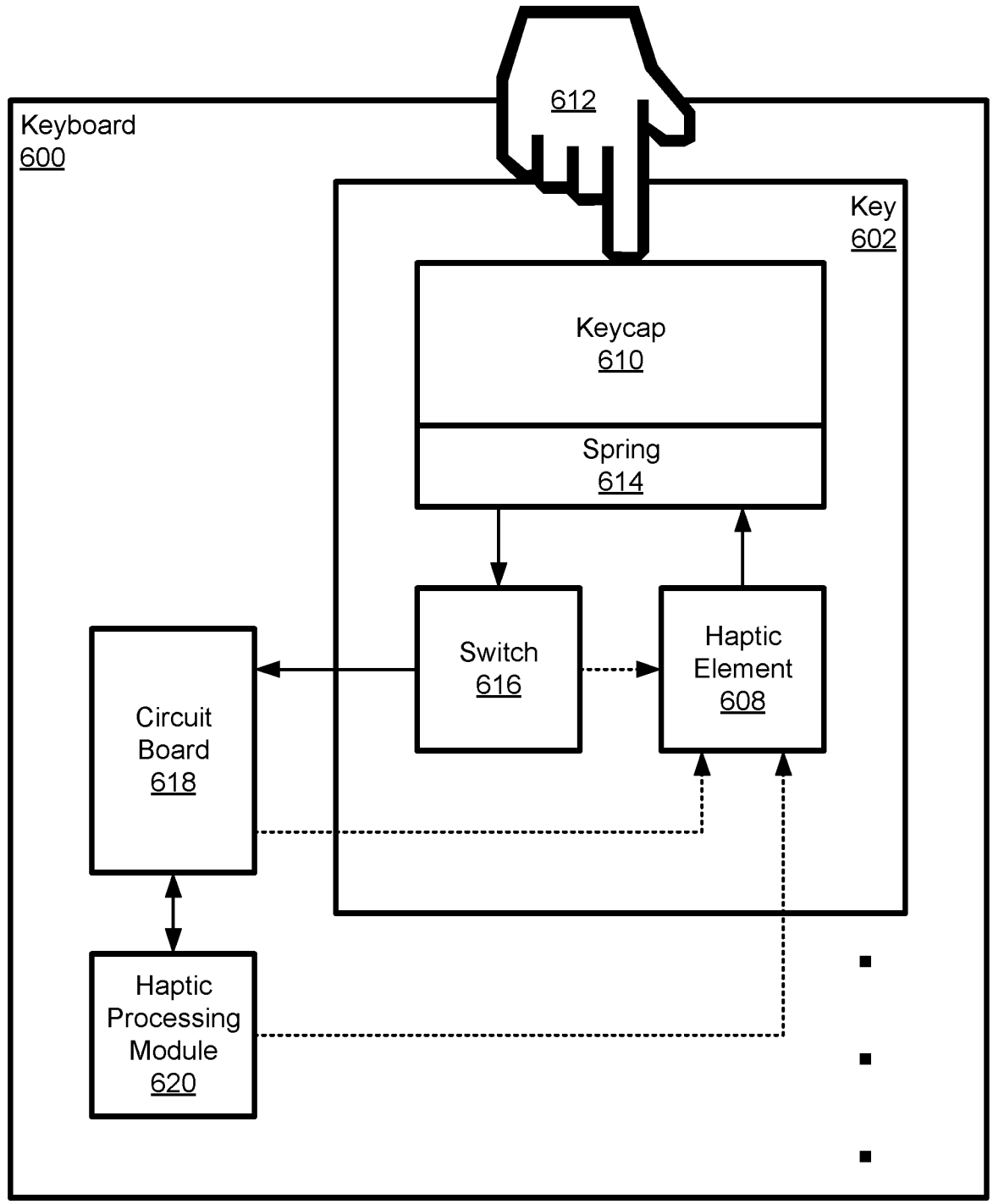
FIG. 6 illustrates a circuit diagram for an example key that both physically depresses and offers haptic feedback to a user.

FIG. 6 illustrates a circuit diagram for an example key 602 that both physically depresses and offers haptic feedback to a user. The key 602 is connected to a keyboard 600, which contains an array of keys (including but not limited to the key 602, as illustrated by an ellipsis below the key 602) arranged in a predetermined pattern (e.g., QWERTY). Each key within the keyboard 600 may be communicatively connected the keyboard 600, and ultimately an associated computing device (also not shown).

The keyboard 600 may also include one or more of a user-depressible touchpad, additional electronic components, and other user user-depressible interface components (e.g., push buttons, dials, and knobs), all not shown. In various implementations, some or all of the individual keys, the touchpad, and the push buttons, dials, and knobs incorporated within the keyboard 600 may both physically depress and offer haptic feedback to the user, as described in detail with regard to the key 602.

The key 602 may have a variety of mechanical arrangements that achieve a specified physical depression magnitude (or key travel), with a variety of force-deflection profiles (see e.g., keys 202, 302, 402, 502 of FIGS. 2-5, respectively). More specifically, the key 602 may include a keycap 610 that provides an interface for a user's finger 612 to apply downward force on the key 602 to actuate the key 602. The key 602 further includes a spring element 614 that provide resistive force to the force applied by the user's finger 612 and returns the key 602 to its original position once the downward force is removed.

The key 602 further still includes a switch 616 that signals to a circuit board 618 within the keyboard 600 when the key 602 has been depressed by the user and when the key 602 returns to its original position. In various implementations, the spring element 614 and the switch 616 may be implemented by one or more of scissor mechanisms, rubber domes, metal domes, resiliently compressible pads, and underlying electrical contacts). Further, the switch 616 may also be 2-pole (e.g., a make/break contact switch) or variable (e.g., a force value driven by variable resistance ink or a piezoelectric cell). A distance that the key 602 collapses when the user applies an expected downward force defines the physical travel of the key 602.

To enhance the user-perceptible physical key travel, the key 602 also includes a haptic element 608 that works in conjunction with a haptic processing module (or driver) 620 within the keyboard 600. The haptic processing module 620 receives a signal from the circuit board 618 that indicates a physical position of the key 602. The communicated physical position of the key 602 may include a variety of points within the physical travel of the key 602 and a direction of physical travel of the key 602 (e.g., downward depression or upward release of the key). When the key 602 achieves one or more predetermined points within its physical travel, the haptic processing module 620 signals directly to the haptic element 608 (or to the haptic element 608 via the circuit board 618) to generate vibration or other repeating forces or motions (collectively, haptic responses) to be transmitted to the user's finger 612 via the keycap 610 (and any other structures therebetween, e.g., the spring element 614).

The haptic element 608 may utilize a variety of technologies to generate the vibration or other repeating forces or motions, which are triggered concurrently or immediately before or after the physical travel of the key 602 and intended to enhance the user-perceptible physical travel of the key 602. The actual physical travel combined with the simulated additional travel of the key 602 may offer the user a more desirable feel and overall performance than either the physical travel or simulated travel would otherwise alone. In various implementations, the haptic element 608 may generate feedback that simulates approximately the same or double the actual physical key travel.

In other implementations, the haptic processing module 620 is located within the key 602 and physically connected to the haptic element 608. In still further implementations, the haptic processing module 620 is omitted and the circuit board 618 performs the function of the haptic processing module 620. In further still implementations, the circuit board 618 is not involved in triggering the haptic element 608 and the switch 616 directly triggers the haptic element 608. Options for triggering the haptic element 608 are illustrated in FIG. 6 by dotted lines extending from the haptic processing module 620, the circuit board 618, and the switch 616 to the haptic element 608.

In various implementations, the keyboard 600 may be physically and/or communicatively coupled to a tablet computer, a laptop computer, a personal computer, a gaming device, a smart phone, or any other discrete device that carries out one or more specific sets of arithmetic and/or logical operations. Further, features of the individual keys (e.g., key 602) of the keyboard 600 described herein may be applied to any push button or other user-depressible interface component, with or without the keyboard 600.

Figure 7:
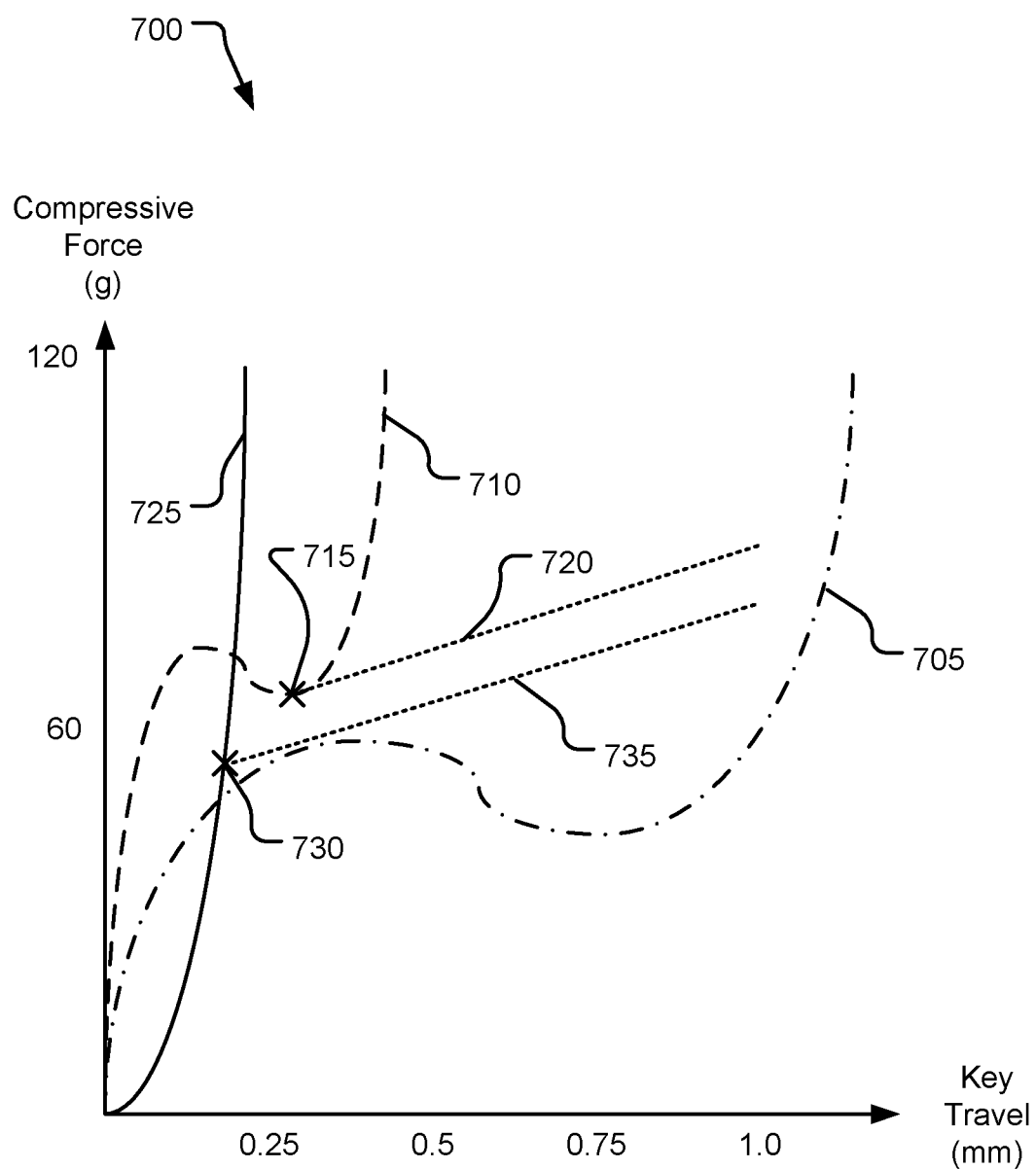
FIG. 7 illustrates an example force-deflection curve comparing physical key travel to simulated key travel caused by haptic feedback to a user.

FIG. 7 illustrates an example force-deflection plot 700 comparing physical key travel to simulated key travel caused by haptic feedback to a user. The plot 700 includes a magnitude of key travel plotted on the x-axis and a magnitude of compressive force applied by a user to a button or key on the y-axis. In various implementations, a haptic feedback element is used to simulate additional physical travel of a key to enhance the user experience, while maintaining actual physical travel of the key within a desired lower range.

Curve 705 illustrates physical travel of a key incorporating a rubber dome switch, but without application of haptic feedback. Specifically, at the beginning of curve 705, force quickly loads the rubber dome up to a point (e.g., at about 60 grams of applied force) where the rubber dome collapses and the force applied drops as the key is depressed about 0.8 mm. Once the rubber dome fully collapses, further key travel is accompanied by exponentially increasing force as the rubber dome and other materials of an associated keyboard are densified. In various implementations, the curve 705 defines a user-desired feel and performance of the key, however, with more physical key travel than is permitted in some specific keyboard designs.

Curve 710 illustrates physical travel of a key incorporating a metal dome switch, also without application of haptic feedback. Specifically, at the beginning of curve 710, force more quickly loads the metal dome up to a point (e.g., at about 70 grams of applied force) where the metal dome collapses and the force applied more abruptly drops as the key is depressed about 0.3 mm. Once the metal dome fully collapses, further key travel is accompanied by a steeper exponentially increasing force as the metal dome and other materials of an associated keyboard are densified. In various implementations, the curve 710 meets a physical key travel design specification, however, does not provide a user-desired feel and performance of the key (e.g., the depression feels too sharp and abrupt).

A haptic feedback device may be used to simulate a portion of the physical key travel of the curve 705, while actual key travel remains as shown in curve 710. Point 715 defines a location on the curve 710 when a haptic element is triggered. Line 720 illustrates a user-perceived additional physical travel of the key that is simulated by the haptic element. As a result, while the actual key travel remains as shown in the curve 710 (e.g., about 0.3 mm), the user may perceive overall key travel to be 1.0 mm and the combined perceived effect of curve 710 and the line 720 are closer to that of the curve 705, simulating the user-desired feel and performance of the key.

Curve 725 illustrates physical travel of a solid elastomeric key, also without application of haptic feedback. Specifically, the curve 725 illustrates that force quickly and exponentially builds as the solid elastomeric key is densified. In various implementations, the curve 725 also meets a physical key travel design specification, however, does not provide a user-desired feel and performance of the key (e.g., the overall depression feels too small).

The haptic feedback element may be used to simulate a portion of the physical key travel of the curve 705, while actual key travel remains as shown in the curve 725. Point 730 defines a location on the curve 725 when the haptic element is triggered. Line 735 illustrates a user-perceived additional physical travel of the key that is simulated by the haptic element. As a result, while the actual key travel remains as shown in curve 725 (e.g., about 0.2 mm), the user may perceive overall key travel to be 1.0 mm and the combined perceived effect of curve 725 and the line 735 are closer to the curve 705, simulating the user-desired feel and performance of the key.

In other implementations, the haptic feedback device may be triggered at a different point on the curves 710, 725 or at multiple points on the curves 710, 725 to provide different simulated effects to the user. In some instances, this may simulate to the user a double-acting key with two distinct depressions within its perceived travel (both physical and simulated). In other implementations, the rubber dome switch illustrated by the curve 705 may also incorporate a haptic element. The curves 705, 710, 725 are examples only, actual force-deflection curves for various keys or push-buttons incorporating the presently disclosed technology may vary widely from that shown.

Figure 8:
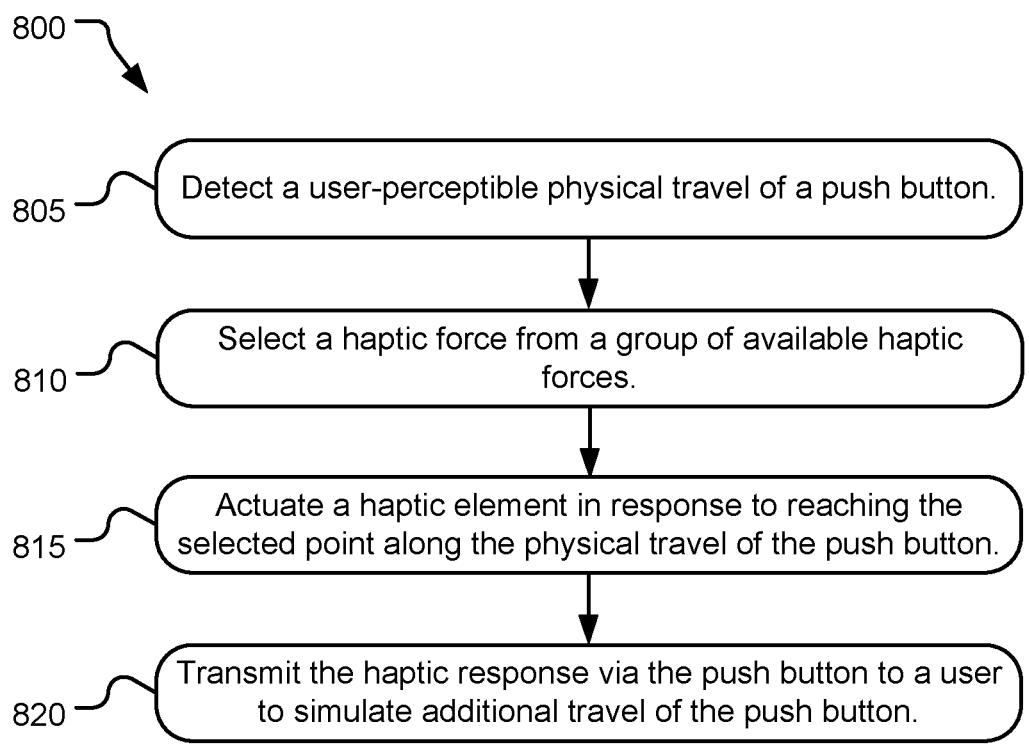
FIG. 8 illustrates example operations for operating a push button that both physically depresses and offers haptic feedback to a user.

FIG. 8 illustrates example operations 800 for providing haptic feedback to a user that physically depresses a push button. A detecting operation 805 detects a user-perceptible physical travel of the push button. In various implementations, the push button has different physical features and arrangements, and may be a key on a keyboard. The push button provides an electric or electronic signal indicating when the push button has been depressed. In some implementations, the electric or electronic signal indicates multiple points along the physical travel of the push button, which indicates a magnitude that the push button is depressed.

A selecting operation 810 selects a haptic response from a group of available haptic responses. The group of available haptic responses may include vibrations that vary in frequency, amplitude, and/or duration, as well as a variety of other forces and associated magnitudes and durations. If the electric or electronic signal indicates multiple points along the physical travel of the push button, the selecting operation 810 may select from the group of available haptic responses a response that corresponds to a specific point that the push button has achieved. Further, the electric or electronic signal may indicate a direction of travel of the push button (e.g., a depressing direction or a releasing direction), which may also influence the selected haptic response from the group of available haptic responses. In other implementations, the electric or electronic signal only indicates one point along the physical travel of the push button and only one haptic response is available for use. As a result, the selecting operation 810 may be omitted.

An actuating operation 815 actuates a haptic element in response to reaching the selected point along the physical travel of the push button. The haptic element is selectively electrically powered to create vibratory or other forces. A transmitting operation 820 transmits the haptic response via the push button to a user to simulate additional travel of the push button. The haptic element is placed within the push button in a position and orientation that is effective to transmit the generated response through portions of the push button between the user's finger and the haptic element. The response that reaches the user's finger simulates additional travel of the push button to the user.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language.

In various implementations, the dimensions provided herein are approximate and defined as +/−10%. In other implementations (e.g., large travel keysets), the provided dimensions may have proportionally greater values than that specifically defined. Further, other dimensions than those specifically provided are contemplated herein.

An example push button according to the presently disclosed technology comprises a spring element with a user-perceptible physical travel upon depression of the push button and a haptic element that simulates additional travel of the push button upon depression of the push button.

In another example push button according to the presently disclosed technology, the spring element includes one or more of a scissor mechanism, a rubber dome, a metal dome, and a resiliently compressible pad.

In another example push button according to the presently disclosed technology, the haptic element includes one or more of an unbalanced motor, a piezoelectric device, an electrostatic device, and an ultrasonic device.

Another example push button according to the presently disclosed technology further comprises a switch that triggers the haptic element at one or more points along the physical travel of the spring element.

In another example push button according to the presently disclosed technology, the haptic element produces a different response dependent on which of multiple points within the physical travel of the push button triggered the haptic element.

In another example push button according to the presently disclosed technology, the haptic element produces a different response dependent on which of two directions the spring element travels at a point along the physical travel of the spring element that triggered the haptic element.

Another example push button according to the presently disclosed technology further comprises a keycap that provides an interface for a user to depress the push button.

In another example push button according to the presently disclosed technology, the user-perceptible physical travel exceeds 0.2 mm.

In another example push button according to the presently disclosed technology, a combination of the user-perceptible physical travel and the simulated additional travel is 0.4 mm and 0.8 mm.

In another example push button according to the presently disclosed technology, the push button is a key within an array of keys on a keyboard.

An example method for providing haptic feedback according to the presently disclosed technology comprises detecting a user-perceptible physical travel of a push button, actuating a haptic element in response to reaching a point along the physical travel of the push button, and transmitting a haptic response from the haptic element via the push button to a user to simulate additional travel of the push button.

In another method for providing haptic feedback according to the presently disclosed technology, the point is one of multiple points along the physical travel of the push button that actuate the haptic element.

Another method for providing haptic feedback according to the presently disclosed technology further comprises selecting the haptic response from a group of available haptic responses depending upon the point reached by the push button.

Another method for providing haptic feedback according to the presently disclosed technology further comprises selecting the haptic response from a group of available haptic responses depending upon a direction of travel of the push button at the point reached by the push button.

In another method for providing haptic feedback according to the presently disclosed technology, the detected user-perceptible physical travel of the push button is caused by the user depressing the push button.

In another method for providing haptic feedback according to the presently disclosed technology, the user-perceptible physical travel of the push button exceeds 0.2 mm.

In another method for providing haptic feedback according to the presently disclosed technology, a combination of the user-perceptible physical travel and the simulated additional travel of the push button is 0.4 mm and 0.8 mm.

In another method for providing haptic feedback according to the presently disclosed technology, the push button is a key within an array of keys on a keyboard.

An example keyboard according to the presently disclosed technology comprises an array of keys, an array of spring elements, and an array of haptic elements. Each spring element is oriented below one of the keys with a user-perceptible physical travel upon depression of the key. Each haptic element is also oriented below one of the keys simulating additional travel upon depression of the key.

Another example keyboard according to the presently disclosed technology further comprises an array of switches, each switch triggering an associated haptic element at one or more points along the physical travel of an associated spring element.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A push button comprising:
   a spring element with a user-perceptible physical travel upon depression of the push button;
   a haptic element that simulates additional travel of the push button upon depression of the push button as the spring element collapses; and
   a switch that triggers the haptic element at a point along the physical travel of the spring element, wherein the haptic element produces a different haptic response dependent on which of a depressing direction and a releasing direction of the physical travel of the push button triggered the haptic element, and wherein the point is one of multiple points along the physical travel of the push button that trigger the haptic element.

2. The push button of claim 1, wherein the spring element also includes one or both of a scissor mechanism and a resiliently compressible pad.

3. The push button of claim 1, wherein the haptic element includes one or more of an unbalanced motor, a piezoelectric device, an electrostatic device, and an ultrasonic device.

4. The push button of claim 1, wherein the haptic element produces a different haptic response dependent on which of the multiple points along the physical travel of the push button triggered the haptic element.

5. The push button of claim 1, further comprising:
   a keycap that provides an interface for a user to depress the push button.

6. The push button of claim 1, wherein the user-perceptible physical travel exceeds 0.2 mm.

7. The push button of claim 1, wherein the push button is one of an array of push button keys on a keyboard.

8. The push button of claim 1, wherein a haptic response to be generated by the haptic element is selected from a group of available varying haptic responses depending on which of the depressing direction and the releasing direction of the physical travel of the push button triggered the haptic element.

9. The push button of claim 1, wherein the spring element is a metal dome spring element.

10. The push button of claim 1, wherein a combination of the user-perceptible physical travel and the simulated additional travel of the push button is between 0.4 mm and 0.8 mm.

11. A method for providing haptic feedback, the method comprising:

detecting a user-perceptible physical travel of a push button, including a collapse of a spring element of the push button;

actuating a haptic element in response to reaching a point along the physical travel of the push button as the spring element collapses, wherein the point is one of multiple points along the physical travel of the push button that actuate the haptic element;

selecting a haptic response from a group of available haptic responses depending on which of a depressing direction and a releasing direction of the physical travel of the push button actuated the haptic element; and transmitting the selected haptic response from the haptic element via the push button to a user to simulate additional travel of the push button.

12. The method of claim 9, further comprising:

selecting the haptic response from a group of available haptic responses depending upon which of the multiple points is reached by the push button.

13. The method of claim 9, wherein the user-perceptible physical travel of the push button is caused by the user depressing the push button.

14. The method of claim 9, wherein the user-perceptible physical travel of the push button exceeds 0.2 mm.

15. The method of claim 9, wherein the push button is one of an array of push button keys on a keyboard.

16. The method of claim 11, wherein the spring element is a metal dome spring element.

17. The method of claim 11, wherein a combination of the user-perceptible physical travel and the simulated additional travel of the push button is between 0.4 mm and 0.8 mm.

18. A keyboard comprising:

an array of keys;

an array of spring elements, each spring element oriented below one of the keys with a user-perceptible physical travel upon depression of the key; and an array of haptic elements, each haptic element also oriented below one of the keys simulating additional travel upon depression of a key as an associated spring element collapses; and an array of switches, each switch triggering one of the haptic elements at a point along the physical travel of an associated spring element, wherein the haptic elements produce a different haptic response dependent on which of a depressing direction and a releasing direction of the physical travel of a key triggered an associated haptic element, and wherein the points are each one of multiple points along the physical travel of an associated spring element that triggered an associated haptic element.

19. The keyboard of claim 18, wherein a haptic element produces a different response dependent on which of multiple points along a physical travel of an associated spring element triggered the haptic element.

20. The keyboard of claim 18, wherein the spring elements are metal dome spring elements.

21. The keyboard of claim 18, wherein a combination of the user-perceptible physical travel and the simulated additional travel of each of the array of keys is between 0.4 mm and 0.8 mm.

* * * * *